(12) United States Patent
Yu et al.

(10) Patent No.: US 11,181,809 B2
(45) Date of Patent: *Nov. 23, 2021

(54) FOCUSING METHOD, IMAGING DEVICE, AND UNMANNED AERIAL VEHICLE

(71) Applicant: SZ DJI TECHNOLOGY CO., LTD., Shenzhen (CN)

(72) Inventors: Lifu Yu, Shenzhen (CN); Wenmeng Teng, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,199

(22) Filed: Jun. 18, 2020

(65) Prior Publication Data

US 2020/0319532 A1    Oct. 8, 2020

Related U.S. Application Data

(63) Continuation of application No. 16/295,127, filed on Mar. 7, 2019, now Pat. No. 10,698,295, which is a continuation of application No. PCT/CN2016/100130, filed on Sep. 26, 2016.

(51) Int. Cl.
- *G03B 13/20* (2021.01)
- *B64C 39/02* (2006.01)
- *G03B 13/36* (2021.01)
- *H04N 5/232* (2006.01)

(52) U.S. Cl.
CPC ............ *G03B 13/20* (2013.01); *B64C 39/024* (2013.01); *G03B 13/36* (2013.01); *H04N 5/232123* (2018.08); *B64C 2201/123* (2013.01)

(58) Field of Classification Search
None
See application file for complete search history.

(56) References Cited

U.S. PATENT DOCUMENTS

| 4,265,528 | A | 5/1981 | Bestenreiner et al. |
| 4,314,748 | A | 2/1982 | Kawabata et al. |
| 7,546,030 | B2 | 6/2009 | Ito et al. |
| 8,213,786 | B2 | 7/2012 | Song |
| 10,698,295 | B2 * | 6/2020 | Yu .......................... G03B 13/36 |
| 2008/0031327 | A1 | 2/2008 | Wang et al. |
| 2008/0136958 | A1 | 6/2008 | Nakahara |
| 2009/0148146 | A1 | 6/2009 | Maeda |

(Continued)

FOREIGN PATENT DOCUMENTS

| CN | 1763624 A | 4/2006 |
| CN | 103945126 A | 7/2014 |

(Continued)

OTHER PUBLICATIONS

The World Intellectual Property Organization (WIPO) The International Search Report for PCT/CN2016/100130 dated Jun. 27, 2017 8 pages.

*Primary Examiner* — William B Perkey
(74) *Attorney, Agent, or Firm* — Anova Law Group, PLLC

(57) ABSTRACT

A focusing method includes determining a present position of a lens, determining an initial search direction based on a relationship between the present position of the lens and a reference position, and controlling the lens to perform a focusing process in the initial search direction.

20 Claims, 8 Drawing Sheets

300

Determine an initial search direction based on a present position of the lens — S310

Control the lens to perform a focusing process in the initial search direction — S320

(56) References Cited

U.S. PATENT DOCUMENTS

2016/0301852 A1 10/2016 Krishnamurthy Sagar et al.
2017/0017136 A1 1/2017 Kao et al.
2019/0204714 A1 7/2019 Yu et al.

FOREIGN PATENT DOCUMENTS

| CN | 104079832 A | 10/2014 |
| CN | 105353765 A | 2/2016 |
| CN | 105391939 A | 3/2016 |
| GB | 2483224 A | 3/2012 |

\* cited by examiner

300

Determine an initial search direction based on a present position of the lens — S310

Control the lens to perform a focusing process in the initial search direction — S320

Control, by a processor, a lens to perform a rough search in the initial search direction — S610

Control, by the processor, the lens to perform a fine search in a direction opposite the initial search direction to determine a focusing position — S620

Control, by the processor, the lens to move to the focusing position — S630

FIG. 6

FOCUSING METHOD, IMAGING DEVICE, AND UNMANNED AERIAL VEHICLE

CROSS-REFERENCE TO RELATED APPLICATION

This application is a continuation application of U.S. patent application Ser. No. 16/295,127, filed on Mar. 7, 2019, which is a continuation application of International Application No. PCT/CN2016/100130, filed on Sep. 26, 2016, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technology field of image processing and, more particularly, to a focusing method, an imaging device, and an unmanned aerial vehicle (UAV).

BACKGROUND

Imaging devices are widely equipped with an auto focus ("AF") function. In particular, contrast focusing methods have been widely implemented for auto focus.

A contrast focusing method requires acquisition of at least three frames of images to determine an initial search direction for a focusing process. As a result, the time spent for the auto focus process is relatively long.

SUMMARY

In accordance with the present disclosure, there is provided a focusing method. The focusing method includes determining an initial search direction based on a present position of a lens. The focusing method also includes controlling the lens to perform a focusing process in the initial search direction.

Also in accordance with the present disclosure, there is provided an imaging device. The imaging device includes an imaging assembly and a processor. The imaging assembly includes a lens. The processor is configured to determine an initial search direction based on a present position of the lens. The processor is also configured to control the lens to perform a focusing process in the initial search direction.

In various embodiments of the present disclosure, by determining an initial search direction based on a present position of the lens, and by controlling the lens to perform the focusing process in the initial search direction, the disclosed methods and systems do not require acquisition of at least three frames of images to determine the initial search direction. As a result, the speed of auto focus is improved.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

FIG. 3 is a flow chart illustrating a focusing method according to an example embodiment.

FIG. 6 is a flow chart illustrating a focusing method according to another example embodiment.

DETAILED DESCRIPTION OF THE EMBODIMENTS

Figure 1:
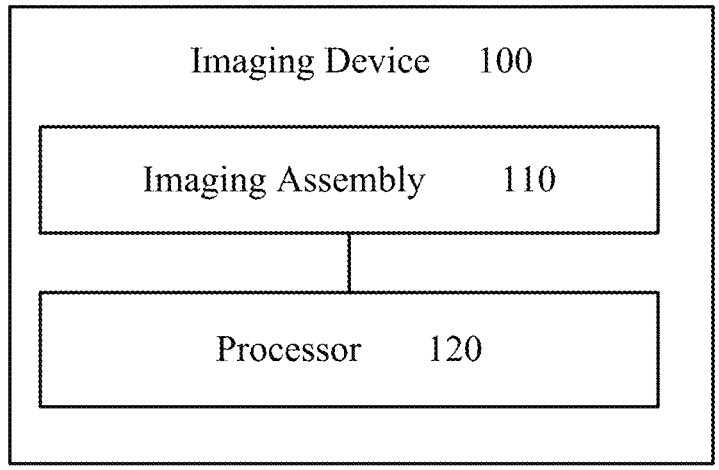
FIG. 1 is a schematic diagram of an imaging device according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The connection may be wired or wireless. When a first component is referred to as "disposed," "located," or "provided" on a second component, the first component may be directly disposed, located, or provided on the second component or may be indirectly disposed, located, or provided on the second component via an intermediate component. The terms "perpendicular," "horizontal," "left," "right," and similar expressions used herein are merely intended for description.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

First, the structural configuration of an imaging device 100 in or through which the disclosed focusing method may be implemented will be described below with reference to FIGS. 1 and 2.

Figure 2:
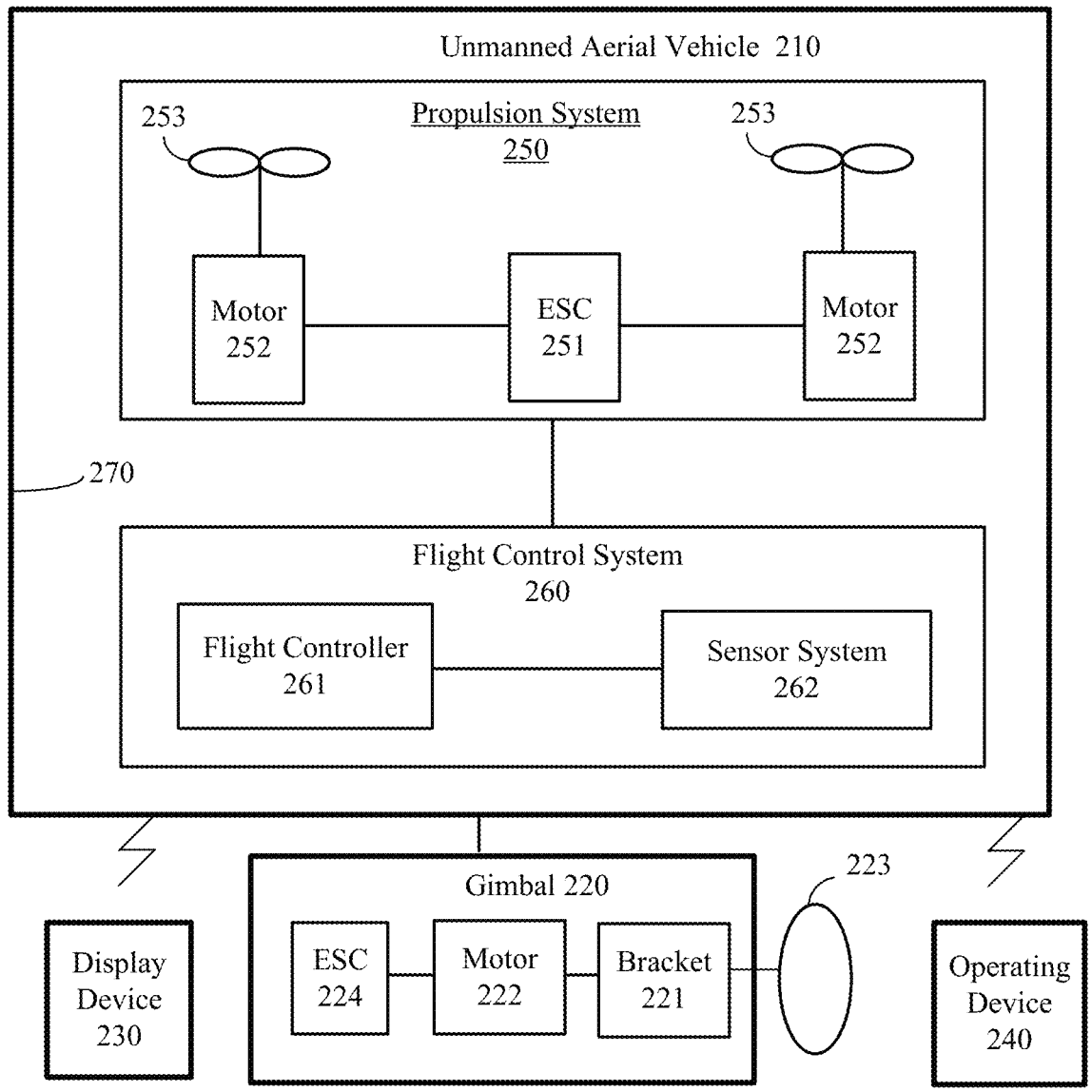
FIG. 2 is a schematic diagram of an unmanned flight system according to an example embodiment.

FIG. 1 is a schematic diagram of the imaging device 100 according to an embodiment of the present disclosure. As shown in FIG. 1, the imaging device 100 includes an imaging assembly 110 and a processor 120.

In some embodiments, the imaging assembly 110 may include a lens, such as a focusing lens, which may be driven by a motor to perform an auto focus process. In some embodiments, the imaging assembly 110 may include any suitable device, unit, or component configured to capture images, such as cameras.

In some embodiments, the imaging assembly 110 may communicate with the processor 120 through a wired or wireless connection. The imaging assembly 110 may receive control signals or commands from the processor 120. The imaging assembly 110 may adjust the focal length based on the control signals.

Without limiting the scope of the present disclosure, in some embodiments, the imaging assembly 110 may include a charge-coupled device ("CCD"). The CCD may also be referred to as a CCD imaging sensor or a CCD imaging controller. A CCD is a semiconductor device that can convert optical images into electrical signals. The photosensitive substance embedded in the CCD is referred to as pixels. The more the pixels on the CCD, the higher the resolution of the captured images. CCD operates like a negative, except that the CCD converts optical signals into electrical charge signals. On a CCD, there may be arrays of photodiodes, which can sense light, and convert the light into an electrical signal. The electrical signal is then sampled, amplified, and converted through an analog-to-digital (AD) converter to become digital image signals.

Without limiting the scope of the present disclosure, in some embodiments, the imaging assembly 110 may include a complementary metal oxide semiconductor ("CMOS"). CMOS is a widely used material for manufacturing integrated circuit chips. CMOS manufacturing processes have also been used to manufacture photosensitive components for digital imaging devices. The principles of operation for converting optical signals into electrical signals in the CCD imaging sensors and CMOS imaging sensors are the same. The main difference between the CCD imaging sensors and the CMOS imaging sensors lies in the signal output process. For a CCD, signals are read out or output from only one (or a few) output node(s). As a result, the signals output from a CCD have excellent consistency. For a CMOS chip, every pixel has its own signal amplifier. Every pixel performs a charge-voltage conversion. As a result, the consistency in the signals output from the CMOS chip is low. For a CCD, in order to output an entire frame of an image signal, the signal transmission bandwidth of an output amplifier need to be large. Whereas in the CMOS chip, the signal transmission bandwidth of an amplifier associated with each pixel is low, which can significantly reduce the power consumption of the chip. This is the one of the main reasons why the CMOS chip consumes less power than the CCD chip. However, although the power consumption is low, inconsistency in millions of amplifiers can cause much higher noise level. This is an advantage of the CMOS as compared to CCD.

The above discussed examples of the imaging assembly 110 are for illustrative purposes only, and the present disclosure is not limited to these examples. Other imaging assembly that can provide auto focus also fall within the scope of the present disclosure.

In some embodiments, the processor 120 and the imaging assembly 110 are communicatively coupled with one another through a wired or wireless connection, and can communicate with each other. The processor 120 may obtain or acquire information relating to a present position of the focusing lens of the imaging assembly 110. The processor 120 may determine an initial search direction based on the present position of the focusing lens. In some embodiments, the processor 120 may also control the focusing lens to perform a focusing process in the initial search direction.

In some embodiments, the processor 120 may be a central processing unit ("CPU"). In some embodiments, the processor 120 may be other general purpose processor, a digital signal processor ("DSP"), an Application Specific Integrated Circuit ("ASIC"), a field programmable gate array ("FPGA"). In some embodiments, the processor 120 may be other programmable logic devices, gates, or transistor logic devices, gate hardware assembly, etc. In some embodiments, the processor 120 may be a microprocessor, or any other regular processor. In some embodiments, the FPGA may be developed based on other programmable components, such as programmable array logic ("PAL"), generic array logic ("GAL"), complex programmable logic device ("CPLD"). FPGA is a semi-custom circuit in the ASIC technical field. FPGA can not only address disadvantages associated with custom-circuits, but also resolve issues associated with the limitation on the number of programmable components or circuits. Based on applications, a system designer may couple the internal logic components of the FPGA through programmable connections, as if an experimental circuit board is placed in a chip. A complete FPGA product out of the manufacturing facility can be customized by a designer by altering the logic components and connections. Thus, FPGA can be used to implement logic functions in various devices.

In some embodiments, various components of the imaging device 100 may be integrated in a single device. For example, the single device may be a camera, a camcorder, or any other smart terminals equipped with imaging functions, such as cell phones, tablets, or laptops, etc.

In some embodiments, various components of the imaging device 100 may be provided in different separate devices. For example, the imaging assembly 110 may be provided in an unmanned aerial vehicle ("UAV"). The processor 120 may be provided in the UAV or may be provided in a control terminal, such as a remote control or a smart terminal installed with control software. The present disclosure does not limit the type of devices.

UAVs have been widely used in civil applications. For example, UAVs have been used for agriculture, aerial photography, wild fire surveillance, etc. Civil applications of the UAVs appear to be a trend for the future.

In some embodiments, a UAV may include a carrier to carry a payload for implementing a task. For example, in aerial photography, a UAV may include a gimbal to carry an imaging device, such as the imaging assembly 110 of the present disclosure. FIG. 2 is schematic diagram of an unmanned flight system 200. For simplicity, the following descriptions use a rotorcraft as an example of the UAV for discussion.

In some embodiments, the unmanned flight system 200 includes a UAV 210, a gimbal 220, a display device 230, and an operating device 240. The UAV 210 includes a propulsion system 250, a flight control system 260, a frame 270, and a focusing processor. The UAV 210 may communicate wirelessly with the operating device 240 and the display device 230.

In some embodiments, the frame 270 may include a body and supporting legs (also referred to as landing gears or landing legs). The body may include a central frame and one or more arms coupled with the central frame. The one or more arms may radially extend from the central frame. The supporting legs may be coupled with the body, and may support the UAV 210 during landing or while landed.

In some embodiments, the propulsion system 250 includes an electrical speed control ("ESC") 251, one or more propellers, and one or more motors 252 corresponding to the one or more propellers. In some embodiments, the motor 252 and the propeller 253 may be mounted on each corresponding arm. The ESC 251 may be configured to receive driving signals generated by the flight control system 260. The ESC 251 may supply an electrical current to the motor 252 based on the driving signals, and may control the speed and rotation direction of the motor 252. In some embodiments, the motor 252 may drive the propeller 253 to rotate, thereby providing propulsion forces to the UAV 210, which enable the UAV 210 to move in one or more degrees of freedom. In some embodiments, the UAV 210 may rotate around one or more axes of rotation. For example, the axes of rotation may include a roll-axis, a yaw-axis, and a pitch-axis. In some embodiments, the motor 252 may be a direct current motor or an alternating current motor. In some embodiments, the motor 252 may be a brushless motor or a brushed motor.

In some embodiments, the flight control system 260 includes a flight controller 261 and a sensor system 262. The sensor system 262 may include various sensors to detect, measure, obtain, sense, or acquire information or data relating to the altitude of the UAV 210. The information includes the position information and status information of the UAV 210, such as the three-dimensional position, three-dimensional angle, three-dimensional velocity, three-dimensional acceleration, and three-dimensional angular velocity, etc. The sensor system 262 may include at least one of a gyroscope, a digital compass, an inertial measurement unit ("IMU"), a vision sensor, a global positioning system ("GPS") sensor, or a barometer. In some embodiments, the flight controller 261 is configured to control the flight of the UAV 210. For example, the flight controller 261 may control the flight of the UAV 210 based on the information relating to the altitude of the UAV 210 that may be acquired by the sensor system 262. In some embodiments, the flight controller 261 may control the flight of the UAV 210 based on pre-programmed instructions, codes, or commands. In some embodiments, the flight controller 261 may control the flight of the UAV 210 by responding to one or more command signals received from the operating device 240.

In some embodiments, the gimbal 220 includes at least one bracket 221 for supporting or carrying the imaging assembly 223. The gimbal 220 also includes at least one motor 222 configured to drive the at least one bracket 221 to rotate. Each motor 222 may drive a corresponding bracket 221 to rotate. In some embodiments, the imaging assembly 223 may be an embodiment of the imaging assembly 110 discussed above, and may have similar or the same structures and functions.

In some embodiments, through the ESC 224 and the motor 222, the flight controller 261 may control the gimbal 220 to rotate, thereby causing the imaging assembly 223 to rotate. In some embodiments, the gimbal 220 may include a controller configured to control the ESC 224 and the motor 222, thereby controlling the rotation of the imaging assembly 223. In some embodiments, the gimbal 220 may be independent from the UAV 210 (e.g., being detachable from the UAV 210 or being separately operated or controlled from the operations of the UAV 210). In some embodiments, the gimbal 220 may be an integral part of the UAV 210. In some embodiments, the motor 222 may be a direct current motor or an alternating current motor. In some embodiments, the motor 222 may be a brushless motor or a brushed motor. In some embodiments, the payload may be placed on a top portion of the UAV 210 or attached to a lower portion of the UAV 210.

Although not shown in the figures, in some embodiments, the unmanned flight system 200 may include a focusing processor. The focusing processor may be programmed or configured to control the imaging assembly 223 to perform a focusing process. The structure and function of the focusing processor may be similar to or the same as the processor 120 discussed above. In some embodiments, the focusing processor may be provided in the UAV 210, or may be provided in the operating device 240 or the display device 230. The present disclosure does not limit the location of the focusing processor.

In some embodiments, the display device 230 may be located on the ground side of the unmanned flight system 200. The display device 230 may communicate with the UAV 210 through wireless communication. The display device 230 may be configured to display the information relating to the altitude of the UAV 210, as well as images captured by the imaging assembly 223. In some embodiments, the display device 230 may be an independent device (e.g., independent of operating device 240), or may be integral with the operating device 240.

In some embodiments, the operating device 240 may be located on the ground side of the unmanned flight system 200. The operating device 240 may communicate with the UAV 210 through wireless communication. The operating device 240 may send signals to the UAV 210 to remotely operate or control the UAV 210. The operating device 240 may be any suitable operating device, such as a remote control or a smart terminal installed with an UAV application, such as a smart phone, a tablet, etc. According to the present disclosure, the operating device 240 may receive input from a user through a wheel, a button, a key, a joystick, or a user interface ("UI"), and may control the UAV 210 based on the input from the user.

In some embodiments, the focusing processor may be a designated processor for performing the focusing processes. In some embodiments, functions of the focusing processor may be implemented in other devices of the unmanned flight system 200, such as a processor included in the operating device 240, or a processor included in the imaging assembly 223. The present disclosure does not limit the manner in which the focusing processor or its functions are implemented.

It is understood that the names of the various components of the unmanned flight system 200 are for identification purposes only, and should not be construed to limit the scope of the present disclosure.

The actions and the interactions between the imaging assembly 223 and a processor (e.g., any processor disclosed herein including the focusing processor) will be explained below.

According to the present disclosure, the focusing method is a contrast focusing method. The contrast focusing method realizes auto focus by detecting edges of a contour of an object in the captured image. The clearer the contour of the object in the captured image, the greater the gradient of the brightness of the image. In other words, the contrast between the edge imaging areas and the background is greater. Conversely, poorly focused images have blurry contour edges, reduced gradient in the brightness or reduced contrast. The poorer the focus, the lower the contrast.

FIG. 3 is a flow chart illustrating a focusing method 300 according to the present disclosure. As shown in FIG. 3, the focusing method includes step S310 and step S320, which may be executed by the processor (e.g., the focusing processor). In step S310, the processor determines an initial search direction based on a present position of a lens, such as a focusing lens. In step S320, the processor controls the lens, such as the focusing lens to perform a focusing process in the initial search direction.

According to the focusing method of the present disclosure, the processor determines the initial search direction based on the present position of the focusing lens, thereby reducing the time spent in determining the initial search direction, and improving the speed of auto focus.

According to embodiments of the present disclosure, in the process of auto focusing, the focusing lens may move back and forth along the optical axis. The processor may determine the present position of the focusing lens on the optical axis, and then determine the initial search direction based on the present position of the focusing lens.

According to embodiments of the present disclosure, the processor may determine the present position of the focusing lens based on information relating to a stroke of a driving device configured to drive the focusing lens to move.

For example, a predetermined relationship between the stroke of the driving device and the position of the focusing lens may be specified. When the processor determines the stroke of the driving device, the processor may determine the present position of the focusing lens based on the stroke and the predetermined relationship between the stroke of the driving device and the position of the focusing lens.

According to embodiments of the present disclosure, as non-limiting examples, the driving device may be a focus motor. The focus motor may be a voice coil motor ("VCM") that may include a coil, a magnets assembly, and resilient brackets. The coil may be mounted to the magnets assembly through two resilient brackets sandwiching the magnets assembly. When an electrical current is supplied to the coil, a magnetic field is generated by the coil, which interacts with the magnets assembly. As a result, the coil may move relative to the magnets assembly, causing the focusing lens to move along the optical axis. When the supply of the electrical current is stopped, the coil moves back under the spring force of the resilient brackets, thereby realizing auto focusing. The processor 120 may generate instructions and/or command signals to control the supply of the electrical current to the coil.

According to embodiments of the present disclosure, as non-limiting examples, the focus motor may be an ultrasonic motor including a stator that has a ring-shaped bottom part, and a rotor that has a ring shape. The ultrasonic motor converts vibration caused by the ultrasonic frequency wave into rotating energy. When an electrical current is supplied to a piezoelectric component of the ring-shaped bottom part of the stator, the stator may vibrate at an amplitude of 0.001 mm at a high frequency of about 30 kHz. As a result, a flexural traveling wave is generated at the contacting interface between the bottom part of the stator and the rotor. The frictional force generated by the flexural traveling wave causes the rotor to rotate, thereby causing the focusing lens to move along the optical axis.

In step S310, the processor determines the initial search direction based on the relationship between the present position of the focusing lens and the reference position.

Alternatively, in some embodiments, the processor may determine the initial search direction based on a relationship between the present position of the focusing lens and a reference position range.

In some embodiments, the reference position or the reference position range may be a specific position or a specific position range pre-set by a manufacturer or a user.

In some embodiments, the reference position or the reference position range may be determined by the processor based on the focal length of the focusing lens.

For example, the processor may determine the reference position or the reference position range based on the focal length of the focusing lens, and a predetermined relationship between the focal length of the focusing lens and reference positions or reference position ranges, which may be pre-set by the manufacturer or the user.

Figure 4:
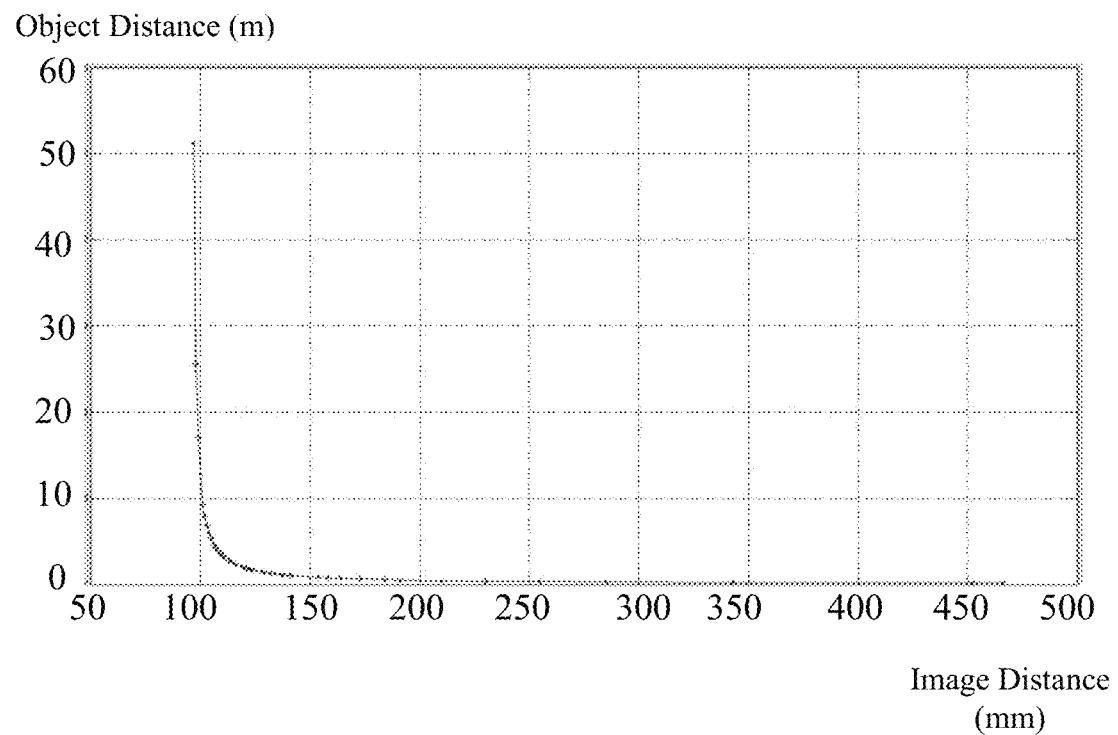
FIG. 4 is a plot illustrating a relationship between the object distance and the image distance according to an example embodiment.

In some embodiments, the processor may determine the reference position or reference position range based on the following relationship: $1/f = 1/v + 1/u$, where f is the focal length of the focusing lens, u is the object distance, and v is the image distance. Typically, the focal length f is at the level of millimeter (mm). Based on this relationship, when the image distance is greater than a predetermined distance v0, any change in the image distance may cause only a small change in the object distance. Within the predetermined distance v0, any change in the image distance may cause a relatively significant change in the object distance. As shown in the example relationship between the object distance and the image distance illustrated in FIG. 4, when the image distance changes in a range within 110 mm, any change in the image distance may cause a large change in the object distance. When the image distance changes in a range beyond 110 mm (e.g., greater than 110 mm), any change in the image distance may only cause a small change in the object distance.

As such, the processor may determine one or more reference position or reference position range based on the relationship between the object distance and the image distance. As a non-limiting example, the number of reference position may be one. Corresponding to the one reference position, the focusing lens may have a first object distance. The focusing lens may have a second object distance at a focusing position in a proximal range. A difference between the first object distance and the second object distance may be smaller than or equal to a first predetermined value. An initial focusing position refers to a position where the focusing lens is located when the object distance is infinity. A distance between the focusing position in the proximal range and the initial focusing position is the total stroke of the focusing lens.

Figure 5:
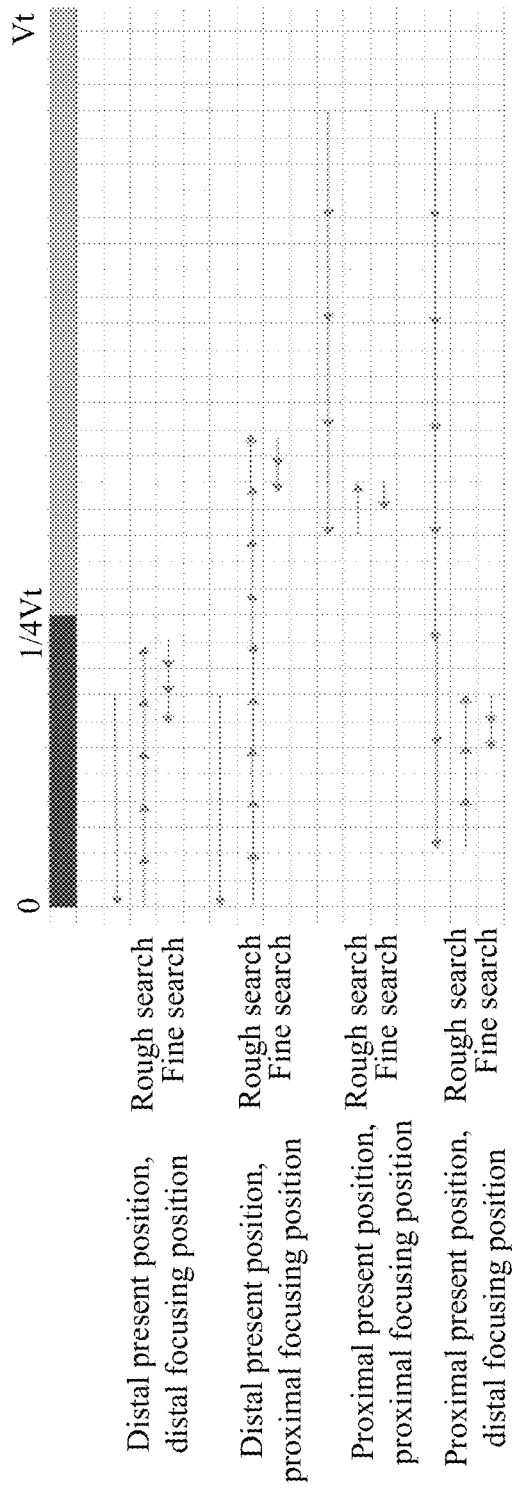
FIG. 5 is a diagram illustrating a method of determining an initial search direction according to an example embodiment.

According to embodiments of the present disclosure, as non-limiting examples, as shown in FIG. 5, when the total stroke of the focusing lens is Vt, the distance between the reference position and the initial focusing position is ¼*Vt. For the convenience of description, the initial focusing position is marked or treated as the 0 position, the stroke ranging from 0 to ¼*Vt is referred to as a distal range, and the remaining part of the stroke (e.g., ¼*Vt to Vt) is referred to as a proximal range. The total stroke Vt may be determined based on the structure of the focusing lens. In other words, the total stroke may be fixed or constant for a focusing lens.

According to embodiments of the present disclosure, when the processor determines the initial search direction, if the processor determines that the present position of the focusing lens is within the distal range, or if the focusing lens is located on a side where the reference position is close to the initial focusing position, the processor may determine that the initial search direction is a direction in which the initial focusing position faces or points to the reference position. The processor may control the focusing lens to perform a focusing process in the initial search direction starting from the present position of the focusing lens.

In some embodiments, as shown in FIG. 5, if the processor determines that the present position of the focusing lens is within the distal range, or if the focusing lens is located on a side where the reference position is close to or adjacent the initial focusing position, the processor may determine the initial search direction as a direction in which the initial focusing position faces or points to the reference position. The processor may control the focusing lens to move to the initial focusing position, and to perform a focusing process in the initial search direction starting from the initial focusing position. As a result, the disclosed embodiments can improve auto focusing speed for distant objects.

In some embodiments, when the processor determines the initial search direction, if the present position of the focusing lens is within the proximal range, or if the focusing lens is located on a side where the reference position is distant from the initial focusing position, the processor may determine the initial search direction as a direction in which the reference position faces or points to the initial focusing position. The processor may control the focusing lens to perform a focusing process in the initial search direction starting from the present position.

FIG. 6 illustrates a focusing method 600 that may be performed by the processor through controlling the focusing lens, after the processor determines the initial search direction. As shown in FIG. 6, the focusing method 600 includes steps S610-S630.

In step S610, the processor controls the lens, such as the focusing lens to perform a rough search in the initial search direction.

A step size for the rough search may be pre-set by the manufacturer or the user. In some embodiments, when the processor controls the focusing lens to perform the rough search in the initial search direction based on the step size, the processor may terminate the rough search when the contrast reduces in at least three consecutive frames of images rendered in the search.

In step S620, the processor controls the lens, such as the focusing lens to perform a fine search in a direction opposite the initial search direction, to determine the focusing position.

In some embodiments, a step size for the fine search may be pre-set by the manufacturer or the user. When the processor controls the focusing lens to perform the fine search based on the step size for the fine search in the direction opposite the initial search direction, the processor may terminate the fine search when the contrast reduces in at least three consecutive frames of images rendered in the search. Through the rough search and the fine search, the processor may determine a position at which the rendered image has the greatest contrast, i.e., the focusing position.

In step S630, the processor controls the lens, such as the focusing lens to move to the focusing position.

According to the embodiments of the present disclosure, the processor may determine an object distance between the object of imaging and the focusing lens. The processor may determine a method for focusing based on the object distance. As non-limiting examples, when the processor determine that the object distance between the object of imaging and the focusing lens is greater than or equal to a second predetermined value, the processor may implement the disclosed focusing method(s).

In some embodiments, the second predetermined value may be pre-set by the manufacturer or the user. For example, the second predetermined value may be 300 meters. The present disclosure does not limit the object distance between the object of imaging and the focusing lens.

The disclosed methods and systems can reduce the auto focus time for imaging distant objects. In addition, the disclosed methods and systems can alleviate the breathing phenomenon that may occur in the focusing process.

With the disclosed methods, devices, or systems, the initial search direction may be determined based on the present position of the focusing lens, thereby reducing the time spent in determining the initial search direction, which can improve the speed of auto focus.

The disclosed focusing methods, devices, or systems may be implemented at least in part by a computer. The computer may include a hardware layer, an operation system layer running on the hardware layer, and an application layer running on the operation system layer. The hardware layer may include a central processing unit ("CPU"), a memory management unit ("MMU"), and a storage device (e.g., memory), etc. The operation system may be a system that can run one or more processes, such as a Linux operation system, a Unix operation system, an Android operation system, an iOS operation system, or a Windows operation system. The application layer may include at least one of an internet browser, a contact application, a word processing application, an instant messaging application, etc. In some embodiments, the computer may be a handheld device, such as a smart phone, or a personal computer. The present disclosure does not limit the type of the computer, as long as the computer is equipped with suitable hardware and software to execute the instructions or codes that implement the disclosed focusing methods.

Various aspects or features of the present disclosure may be implemented as methods or devices, or may be implemented through programming, or may be implemented as products of engineering. The term "product" used in the present disclosure encompasses any computer program that may be read from any non-transitory computer-readable medium, device, or apparatus. For example, the computer-readable medium may include, but not be limited to, magnetic storage device (e.g., hard disk, soft disk, or tape, etc.), optical disc (e.g., compact disc ("CD"), compressed drive, digital versatile disc ("DVD"), etc.), smart card, flash drive (e.g., erasable programmable read-only memory ("EPROM"), card, stick, or key drive, etc.). Moreover, the various storage medium or device disclosed herein may include one or more devices configured to store information, data, signal, etc. The various storage medium disclosed herein may include any other computer-readable media. The term "computer-readable medium" may include, but not be limited to, wireless channels and other media that may store, include, carry commands and/or data.

The embodiments of the disclosed focusing methods are described above. The embodiments of the disclosed imaging device will be described below.

Figure 7:
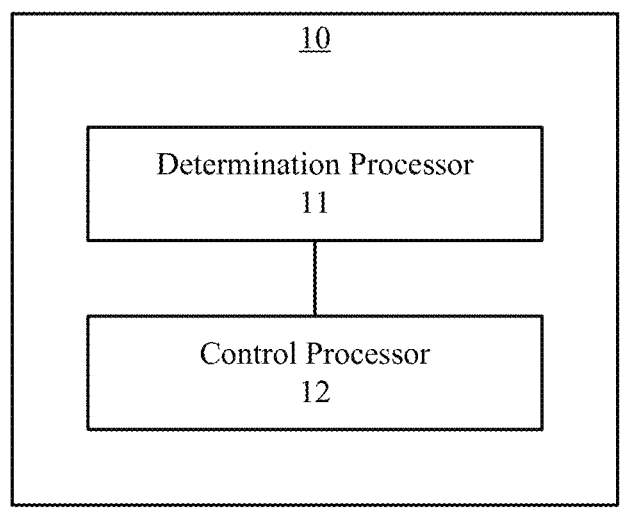
FIG. 7 is a schematic diagram of an imaging device according to an example embodiment.

FIG. 7 is a schematic diagram of an imaging device. As shown in FIG. 7, an imaging device 10 includes a determination processor 11 configured or programmed to determine an initial search direction based on information relating to the present position of the focusing lens. The imaging device 10 also includes a control processor 12 configured or programmed to control the focusing lens to perform a focusing process in the initial search direction.

The disclosed imaging device of the present disclosure determines the initial search direction based on the present position of the focusing lens, thereby reducing the time spent in determining the initial search direction. As a result, the auto focus speed can be improved.

In some embodiments, the determination processor may be configured or programmed to determine the present position of the focusing lens based on information relating to the stroke of the driving device. The driving device may be configured to drive the focusing lens to move along an optical axis.

In some embodiments, the determination processor 11 may be configured or programmed to determine the initial search direction based on a relationship between the present position of the focusing lens and a reference position.

In some embodiments, the determination processor 11 may be configured or programmed to determine the reference position.

In some embodiments, the determination processor 11 may be configured or programmed to determine the reference position based on predetermined information relating to the reference position.

In some embodiments, the determination processor 11 may be configured or programmed to determine the reference position based on the focal length of the focusing lens.

In some embodiments, the determination processor 11 may be configured or programmed to determine the reference position based on a relationship between the focal length, the object distance, and the image distance of the focusing lens.

In some embodiments, the number of reference position is one or more than one.

In some embodiments, the number of reference position is one. In some embodiments, a difference between a first object distance and a second object distance corresponding to the focusing lens at the reference position is smaller than or equal to a first predetermined value. In some embodiments, the second object distance is an object distance corresponding to a focusing position of the focusing lens in a proximal range. In some embodiments, an object distance corresponding to the focusing lens at an initial focusing position is infinity. In some embodiments, a distance between the focusing position in the proximal range and the initial focusing position equals to a total stroke of the focusing lens.

In some embodiments, the determination processor 11 may be configured or programmed to, when determining that the present position is on a first side of the reference position, determine the initial search direction as a first direction. The first side of the reference position is a side that is adjacent the initial focusing position, and the first direction is a direction in which the initial focusing position faces or points to the reference position.

In some embodiments, the control processor 12 may be configured or programmed to control the focusing lens to move to the initial focusing position, and to control the focusing lens to perform the focusing process in the initial search direction starting from the initial focusing position.

In some embodiments, the determination processor 11 may be configured or programmed to, when determining that the present position is on a second side of the reference position, determine the initial search direction as a second direction. The second side of the reference position is a side that is distant from the initial focusing position. The second direction is a direction in which the reference position faces or points to the initial focusing position.

In some embodiments, the control processor 12 may be configured or programmed to control the focusing lens to perform the focusing process in the initial search direction starting from the present position.

In some embodiments, the total stroke of the focusing lens is four times of a distance between the reference position and the initial focusing position.

In some embodiments, the control processor 12 may be configured or programmed to determine that an object distance between the object of imaging and the focusing lens is greater than or equal to a second predetermined value.

Descriptions of the imaging device may refer to the descriptions of the corresponding focusing method 300 discussed above. Various modules, components, devices, and units included in the imaging device can be used, operated, programmed, or configured to implement one or more steps of the method 300.

According to various embodiments of the present disclosure, the disclosed imaging device determines the initial search direction based on the present position of the focusing lens, thereby reducing the time spent in determining the initial search direction. As a result, the speed of auto focus is improved.

Figure 8:
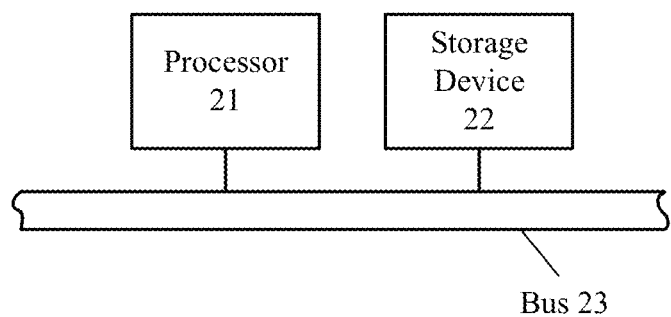
FIG. 8 is a schematic diagram of an unmanned aerial vehicle according to an example embodiment.

FIG. 8 is a schematic diagram of a UAV according to an embodiment of the present disclosure. As shown in FIG. 8, the UAV 20 includes a processor 21 and a storage device 22. The processor 21 may be operably coupled with the storage device 22 through a data communication bus 23. The storage device 22 may store commands, codes, or instructions executable by the processor 21 to perform the methods disclosed herein, including the method 300.

A person having ordinary skill in the art can appreciate that when the description mentions "an embodiment" or "an example," it means that characteristics, structures, or features related to the embodiment or example are included in at least one embodiment or example of the present disclosure. Thus, when the description uses "in an embodiment" or "in an example" or similar terms, it does not necessarily mean the same embodiment. Various characteristics, structures, or features of various embodiments may be combined in a suitable manner. Various characteristics, structures, or features of one embodiment may be incorporated in another embodiment.

A person having ordinary skill in the art can appreciate that the reference numbers for the steps of the methods does not necessarily indicate the sequence of execution of the steps. The sequence for executing the various steps is to be determined by the functions of the steps and the internal logic between the steps. The example sequence shown in the flow charts or discussed in the descriptions should not be construed as limiting the scope of the present disclosure.

A person having ordinary skill in the art can appreciate that when the description refers to "B corresponding to A," it means that B is related to A, and B can be determined based on A. It should be understood that when B can be determined based on A, it does not necessarily mean that B can only be determined based on A. B may be determined based on A and/or other information.

A person having ordinary skill in the art can appreciate that when the term "and/or" is used, the term describes a relationship between related items. The term "and/or" means three relationships may exist between the related items. For example, A and/or B can mean A only, A and B, and B only. The symbol "/" means "or" between the related items separated by the symbol.

A person having ordinary skill in the art can appreciate that part or all of the above disclosed methods and processes may be implemented using related electrical hardware, or a combination of electrical hardware and computer software that may control the electrical hardware. Whether the implementation is through hardware or software is to be determined based on specific application and design constraints. A person of ordinary skill in the art may use different methods for different applications. Such implementations fall within the scope of the present disclosure.

A person having ordinary skill in the art can appreciate that descriptions of the functions and operations of the system, device, and unit can refer to the descriptions of the disclosed methods.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using interfaces. The indirect couplings or communication connections between devices or units or components may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component.

The computer program instructions may be stored in a non-transitory computer-readable storage medium. When the computer program instructions are executed by a processor or controller, method performed by the processor or controller may include the above disclosed methods or processes. The non-transitory computer-readable storage medium can be any medium that can store program codes, for example, a magnetic disk, an optical disk, a read-only memory (ROM), or a random access memory (RAM), etc.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A focusing method, comprising:
   determining a present position of a lens;
   determining an initial search direction based on a relationship between the present position of the lens and a reference position; and
   controlling the lens to perform a focusing process in the initial search direction.

2. The focusing method of claim 1, further comprising:
   determining the reference position based on at least one of predetermined information relating to the reference position, a focal length of the lens, or a relationship between the focal length, an object distance, and an image distance of the lens.

3. The focusing method of claim 2, wherein a number of the reference position is one or more than one.

4. The focusing method of claim 3,
   wherein the number of the reference position is one,
   wherein a difference between a first object distance and a second object distance corresponding to the lens at the reference position is smaller than or equal to a first predetermined value,
   wherein the second object distance is an object distance corresponding to a focusing position of the lens in a proximal range,
   wherein an object distance corresponding to the lens at an initial focusing position is infinity, and
   wherein a distance between the focusing position in the proximal range and the initial focusing position equals to a total stroke of the lens.

5. The focusing method of claim 4, wherein determining the initial search direction based on the relationship between the present position of the lens and the reference position comprises:
   when determining that the present position is on a first side of the reference position, determining the initial search direction as a first direction,
   wherein the first side of the reference position is a side that is adjacent the initial focusing position, and the first direction is a direction in which the initial focusing position points to the reference position.

6. The focusing method of claim 5, wherein controlling the lens to perform the focusing process in the initial search direction comprises:
   controlling the lens to move to the initial focusing position; and
   controlling the lens to perform the focusing process in the initial search direction starting from the initial focusing position.

7. The focusing method of claim 5, wherein determining the initial search direction based on the relationship between the present position of the lens and the reference position comprises:

when determining that the present position is on a second side of the reference position, determining the initial search direction as a second direction, wherein the second side of the reference position is a side that is distant from the initial focusing position, and wherein the second direction is a direction in which the reference position points to the initial focusing position.

8. The focusing method of claim 7, wherein controlling the lens to perform the focusing process in the initial search direction comprises:

controlling the lens to perform the focusing process in the initial search direction starting from the present position.

9. The focusing method of claim 4, wherein the total stroke of the lens is four times of a distance between the reference position and the initial focusing position.

10. The focusing method of claim 1, further comprising:

prior to determining the initial search direction based on the present position of the lens, determining that an object distance between the object of imaging and the lens is greater than or equal to a second predetermined value.

11. The focusing method of claim 1, wherein determining a present position of the lens includes:

determining the present position of the lens based on information relating to a stroke of a driving device configured to drives the lens to move.

12. An imaging device, comprising:

an imaging assembly; and a processor, wherein the imaging assembly comprises a lens, and wherein the processor is configured to:

determine a present position of a lens;

determine an initial search direction based on a relationship between the present position of the lens and a reference position; and control the lens to perform a focusing process in the initial search direction.

13. The imaging device of claim 12, wherein the processor is further configured to:

determine the reference position based on at least one of predetermined information relating to the reference position, a focal length of the lens, or a relationship between the focal length, an object distance, and an image distance of the lens.

14. The imaging device of claim 13, wherein a number of the reference position is one or more than one.

15. The imaging device of claim 14, wherein the number of the reference position is one, wherein a difference between a first object distance and a second object distance corresponding to the lens at the reference position is smaller than or equal to a first predetermined value, wherein the second object distance is an object distance corresponding to a focusing position of the lens in a proximal range, wherein an object distance corresponding to the lens at an initial focusing position is infinity, and wherein a distance between the focusing position in the proximal range and the initial focusing position equals to a total stroke of the lens.

16. The imaging device of claim 15, wherein the processor is further configured to:

when determining that the present position is on a first side of the reference position, determine the initial search direction as a first direction, wherein the first side of the reference position is a side that is adjacent the initial focusing position, and the first direction is a direction in which the initial focusing position points to the reference position.

17. The imaging device of claim 16, wherein the processor is further configured to:

control the lens to move to the initial focusing position; and control the lens to perform the focusing process in the initial search direction starting from the initial focusing position.

18. The imaging device of claim 15, wherein the processor is further configured to:

when determining that the present position is on a second side of the reference position, determine the initial search direction as a second direction, wherein the second side of the reference position is a side that is distant from the initial focusing position, and wherein the second direction is a direction in which the reference position points to the initial focusing position.

19. The imaging device of claim 18, wherein the processor is further configured to:

control the lens to perform the focusing process in the initial search direction starting from the present position.

20. The imaging device of claim 15, wherein the total stroke of the lens is four times of a distance between the reference position and the initial focusing position, and wherein prior to determining the initial search direction based on the present position of the lens, the processor is further configured to:

determine that an object distance between the object of imaging and the lens is greater than or equal to a second predetermined value.

* * * * *